United States Patent
Kim et al.

(10) Patent No.: US 8,743,519 B2
(45) Date of Patent: Jun. 3, 2014

(54) METHOD AND DEVICE FOR RECLOSING CONTROL USING A HARMONIC RATIO

(75) Inventors: Chul Hwan Kim, Gyeonggi-do (KR); Chul Moon Lee, Gyeonggi-do (KR); Hun Chul Seo, Gyeonggi-do (KR)

(73) Assignee: Sungyunkwan University Foundation for Corporate Collaboration, Suwon-Si (KR)

( * ) Notice: Subject to any disclaimer, the term of this patent is extended or adjusted under 35 U.S.C. 154(b) by 442 days.

(21) Appl. No.: 13/179,696

(22) Filed: Jul. 11, 2011

(65) Prior Publication Data

US 2012/0176712 A1 Jul. 12, 2012

(30) Foreign Application Priority Data

Jan. 10, 2011 (KR) ........................ 10-2011-0002137

(51) Int. Cl.
 *H02H 3/00* (2006.01)
(52) U.S. Cl.
 USPC .................................. 361/60; 361/2; 361/59
(58) Field of Classification Search
 None
 See application file for complete search history.

(56) References Cited

U.S. PATENT DOCUMENTS

2008/0031520 A1* 2/2008 Hou .............................. 382/168
2010/0066381 A1* 3/2010 Mousavi et al. .............. 324/500

OTHER PUBLICATIONS

Lee, et al., "A Study on the Adaptive Reclosing Algorithm Using a Harmonic Ratio", 16th International Conference on Electrical Engineering, Jul. 11-14, 2010.

* cited by examiner

*Primary Examiner* — Jared Fureman
*Assistant Examiner* — Terrence Willoughby
(74) *Attorney, Agent, or Firm* — Pearne & Gordon LLP

(57) ABSTRACT

The reclosing control device configured to perform a reclosing control in case of a fault in a transmission line. Further, the reclosing control device includes a voltage detection unit configured to detect a faulted phase voltage waveform and extract a harmonic component contained in the faulted phase voltage waveform; a HR calculating unit configured to calculate ratio values between even harmonics and odd harmonics based on the extracted harmonic component; and a reclosing control unit configured to determine whether or not an arc is finally extinguished based on the calculated ratio value and perform a reclosing control depending on a result of the determination.

9 Claims, 8 Drawing Sheets

METHOD AND DEVICE FOR RECLOSING CONTROL USING A HARMONIC RATIO

FIELD OF THE INVENTION

The present disclosure relates to a method and a device for reclosing control using a harmonic ratio. To be specific, the present disclosure relates to a method and a device for reclosing control using a harmonic ratio that controls reclosing in case of a fault in a transmission line.

BACKGROUND OF THE INVENTION

A single line-to-ground fault is the most frequently happening problem in a transmission line. Statistically, a single line-to-ground fault accounts for about 70% or more of problems happening in an extra high voltage transmission line, and in an ultrahigh voltage transmission line having wider line spacing and having a voltage of about 200 kV or higher, single line-to-ground fault accounts for about 90% or more of problems since other problems such as a line-to-line fault, double line-to-ground fault and three phase fault occur relatively less frequently.

Since most of the problems are passing problems mainly caused by natural environment, in case of a transient fault (direct lightning or induced lightning), line-to-line fault, it is very important to perform reclosing for preventing a stop of supplying power.

Typically, in a conventional reclosing method applied to domestic transmission lines, after certain predetermined dead time, a circuit breaker is automatically reclosed. An automatic reclosing method includes a three-phase auto reclosing method, a single phase auto reclosing method, and a multi-phase (single phase+three-phase) auto reclosing method.

In the three-phase auto reclosing method, in case of a fault in a transmission line, a three-phase circuit breaker is opened and reclosed. In the single phase auto reclosing method, in case of a single line-to-ground fault, only a phase having the fault is opened and reclosed. In the multi-phase auto reclosing method, in case of a single line-to-ground fault, only a phase having the fault is opened and reclosed and in case of a fault in a multi-phase circuit breaker, a three-phase circuit breaker is opened and reclosed.

However, since a conventional auto reclosing method has a certain dead time, even after an arc is extinguished, there may be an unnecessary dead time and even if faults are not completely removed, a reclosing operation may be performed. Further, a reclosing operation may be performed even in case of a permanent fault, there may threaten a power system stability and be a serious loss in power equipment.

Therefore, limitations of the conventional auto reclosing method need to be improved to perform an auto reclosing operation more efficiently.

BRIEF SUMMARY OF THE INVENTION

An embodiment of the present disclosure provides a device and a method for reclosing control using a harmonic ratio by effectively detecting a final extinction point of an arc in case of a fault in a transmission line to minimize an unnecessary dead time and stably control a reclosing operation, resulting in an increase in reliability of power supply.

In view of the foregoing, in accordance with an embodiment of the present disclosure, there is provided a reclosing control device configured to perform a reclosing control in case of a fault in a transmission line. The reclosing control device includes a voltage detection unit configured to detect a faulted phase voltage waveform and extract a harmonic component contained in the faulted phase voltage waveform; a HR calculating unit configured to calculate ratio values between even harmonics and odd harmonics based on the extracted harmonic component; and a reclosing control unit configured to determine whether or not an arc is finally extinguished based on the calculated ratio value and perform a reclosing control depending on a result of the determination.

Further, in accordance with an embodiment of the present disclosure, there is provided a reclosing control method using a reclosing control device. The reclosing control method includes (a) detecting a faulted phase voltage waveform; (b) extracting a harmonic component contained in the faulted phase voltage waveform; (c) calculating ratio values between even harmonics and odd harmonics based on the extracted harmonic component; and (d) determining whether or not an arc is finally extinguished based on the calculated ratio values and performing a reclosing control depending on a result of the determination.

In accordance with one of the above-described embodiments, a ratio between even harmonics and odd harmonics as harmonic components contained in a faulted phase voltage waveform is calculated and a final extinction point of an arc in case of a fault in a transmission line is effectively detected based on the calculated ratio to minimize an unnecessary dead time and stably control a reclosing operation, so that reliability of power supply can be increased.

Further, in accordance with one of the above-described embodiments, a minimum value of ratio values between even harmonics and odd harmonics is filtered through an aftertreatment process and the minimum value and a preset reference value are compared with each other, so that a final extinction point of an arc can be detected more effectively.

BRIEF DESCRIPTION OF THE DRAWINGS

Non-limiting and non-exhaustive embodiments will be described in conjunction with the accompanying drawings. Understanding that these drawings depict only several embodiments in accordance with the disclosure and are, therefore, not to be intended to limit its scope, the disclosure will be described with specificity and detail through use of the accompanying drawings, in which.

DETAILED DESCRIPTION OF THE INVENTION

Figure 1:
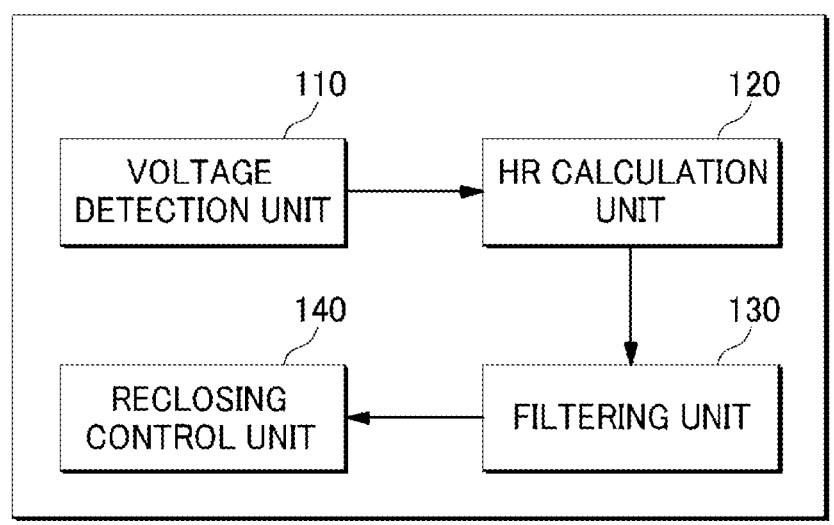
FIG. 1 provides a block diagram of a reclosing control device in accordance with an embodiment of the present disclosure.

Hereinafter, embodiments of the present disclosure will be described in detail with reference to the accompanying drawings so that the present disclosure may be readily implemented by those skilled in the art. However, it is to be noted that the present disclosure is not limited to the embodiments but can be realized in various other ways. In the drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electrically connected or coupled to" another element via still another element. Further, the term "comprises or includes" and/or "comprising or including" used in the document means that one or more other components, steps, operation and/or existence or addition of elements are not excluded in addition to the described components, steps, operation and/or elements.

FIG. 1 provides a block diagram of a reclosing control device in accordance with an embodiment of the present disclosure.

As depicted in FIG. 1, a reclosing control device 100 may include a voltage detection unit 110, a HR calculation unit 120, a filtering unit 130, and a reclosing control unit 140. The reclosing control device 100 can be implemented as a reclosing relay or can be included in a reclosing relay.

The voltage detection unit 110 may detect a faulted phase voltage waveform and extract harmonic components contained in the faulted phase voltage waveform. Herein, the voltage detection unit 110 may extract harmonic components contained in the faulted phase voltage waveform by using a STFT (Short Time Fourier Transform).

The HR calculation unit 120 may calculate a harmonic ratio (HR) value between even harmonics and odd harmonics based on the extracted harmonic components. To be more specific, the HR calculation unit 120 may calculate a HR value by analyzing a ratio between even harmonics and odd harmonics among the harmonic components contained in the faulted phase voltage waveform. More details thereof will be provided in FIG. 2.

The filtering unit 130 may position a window of a certain size at a waveform (hereinafter, referred to as "HR waveform") having the HR calculated by the HR calculation unit 120 and may extract a minimum value of the HR values included in the window while moving the window. In this case, a size of the window may be about 16.67 ms and a sampling frequency may be about 7.2 kHz. The filtering unit 130 can be implemented as a minimum filter of FIG. 5 to be described later.

The reclosing control unit 140 may determine whether or not an arc (a secondary arc) is finally extinguished and may perform a reclosing control depending on a result of the determination. In case of a fault in a transmission line, a waveform before the fault is removed by a circuit breaker may show a very high fault current. Thereafter, when the circuit breaker is tripped, a primary arc may be removed. However, by a capacitive coupling between a faulted phase and a healthy phase, an arc may continuously flow through a fault point. Such an arc may be called "secondary arc". The secondary arc may be ionized by the primary arc and may be generated from a high-temperature gas, and, thus, the secondary arc may not be spread for a long time and may be naturally extinguished finally depending on a secondary arc current, a restriking voltage, and a length of the arc.

The reclosing control unit 140 may determine whether or not the secondary arc is finally extinguished by comparing the HR value calculated by the HR calculation unit 120 with a preset reference value and may perform a reclosing control depending on a result of the determination. In this case, the filtering unit 130 may be omitted from the present disclosure.

Further, in accordance with another embodiment, a reclosing control unit 140 may determine whether or not a secondary arc is finally extinguished by comparing a minimum value filtered by a filtering unit 130 with a preset reference value and if the secondary arc is finally extinguished, the reclosing control unit 140 may perform a reclosing control. For example, if the minimum value extracted by the filtering unit 130 is smaller than or equal to the reference value, the reclosing control unit 140 may determine that the secondary arc is finally extinguished and may perform the reclosing control.

As described above, by effectively detecting a final extinction point of an arc and performing a reclosing operation, a dead time can be minimized and a power supply stop time can be minimized.

Figure 2:
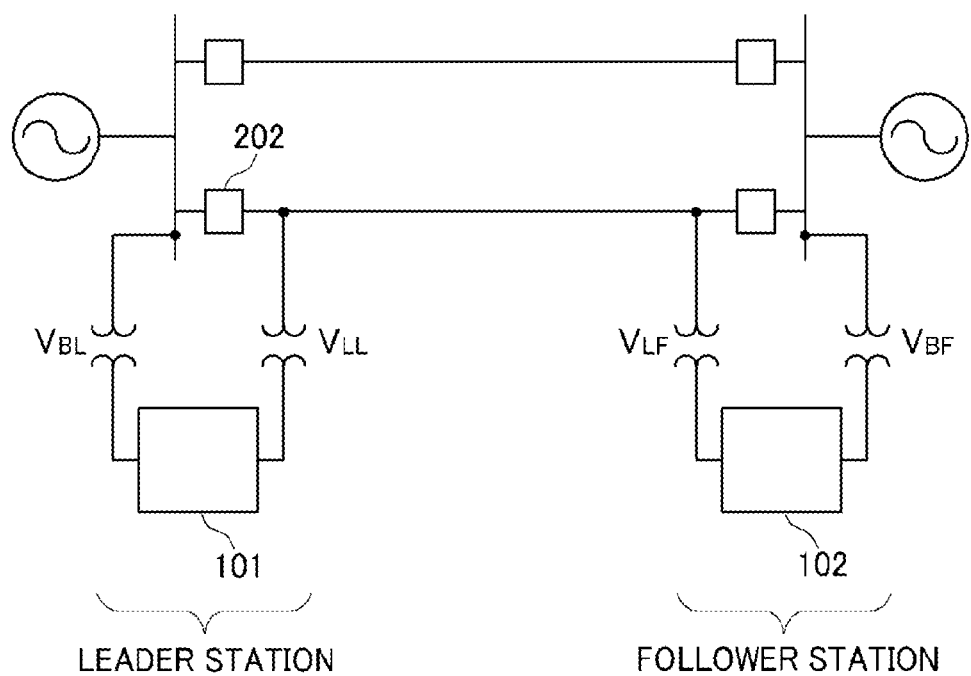
FIG. 2 shows a configuration example of a reclosing relay including the reclosing control device of FIG. 1.

FIG. 2 shows a configuration example of a reclosing relay including the reclosing control device of FIG. 1.

As depicted in FIG. 2, reclosing relays 101 and 102 may be provided at a leader station and a follower station in a transmission line. In this case, the reclosing control device 100 of FIG. 1 may be implemented as the reclosing relays 101 and 102 and may be included in each of the leader station and the follower station or may be configured as a separate device to be connected with the leader station and the follower station. The reclosing control device 100 may promptly determine final extinction of the secondary arc generated when there is a fault in an ultra high voltage transmission line and may minimize the power supply stop time.

The reclosing relays 101 and 102 may perform operations after a circuit breaker 202 is opened in case of a fault in a transmission line. To be specific, after the circuit breaker 202 is opened, the reclosing relays 101 and 102 may detect a faulted phase voltage waveform and extract harmonic components contained in the faulted phase voltage waveform. Further, the reclosing relays 101 and 102 may extract harmonic components contained in the faulted phase voltage by using a short time Fourier transform (STFT).

The short time Fourier transform used for extracting harmonic components contained in the faulted phase voltage waveform can be defined as expressed in the following equations 1(1) to 1(3).

[Equation 1]

$$a_k = \frac{1}{SN}\sum_{n=1}^{SN-1}\left(x[n]\cos\frac{2\pi n}{SN}k\right), \quad k > 0 \quad (1)$$

$$b_k = \frac{1}{SN}\sum_{n=1}^{SN-1}\left(x[n]\sin\frac{2\pi n}{SN}k\right), \quad k > 0 \quad (2)$$

$$H_k = \sqrt{a_k^2 + b_k^2}, \quad k > 0 \quad (3)$$

Herein, $a_k$ may denote a size of a cosine component of a $k^{th}$ harmonic component, and a $b_k$ may denote a size of a sine component of the $k^{th}$ harmonic component. Further, SN may denote a number of samplings.

Characteristics of the above-described harmonic components are as follows. Firstly, as a order of a harmonic becomes increased, an amount of the harmonic components contained in the voltage waveform may be sharply decreased. Therefore, in consideration of the harmonic components contained in the voltage waveform of the faulted phase secondary arc, just harmonic components of a low order may be sufficient. Secondly, as for odd harmonics, harmonic components may have great values near a secondary arc extinction point and may have very small values before then. Thirdly, as for even harmonics, harmonic components may have relatively great values near the secondary arc extinction point and may also have a predetermined value or higher before then.

The above-described second and third characteristics may be obtained because when a secondary arc route is regarded as stable, a faulted phase voltage waveform may be formed into a substantially square wave and may include even harmonic components relatively more than odd harmonic components. In order to show a difference between the even harmonic components and the odd harmonic components in a normalized index, the following harmonic ratio (HR) may be defined.

Herein, the reclosing relays 101 and 102 may analyze a ratio between the even harmonics and the odd harmonics among the harmonic components contained in the faulted phase voltage waveform to calculate a HR value which can be defined by the following equation 2.

$$HR = \frac{\sqrt{\sum_{n=1}^{m} V_{2n+1}^2}}{\sqrt{\sum_{n=1}^{m} V_{2n}^2}}$$ [Equation 2]

In the equation 2, $V_{2i}$, may denote an even harmonic component and $V_{2n+1}$ may denote an odd harmonic component. By way of example, if a harmonic component up to a seventh harmonic is extracted, a HR value can be defined as expressed in the following equation 3.

$$HR = \frac{\sqrt{V_3^2 + V_5^2 + V_7^2}}{\sqrt{V_2^2 + V_4^2 + V_6^2}}$$ [Equation 3]

In the equation 3, $V_2$, $V_4$ and $V_6$ may denote even harmonics and $V_3$, $V_5$ and $V_7$ may denote odd harmonics.

Figure 3:
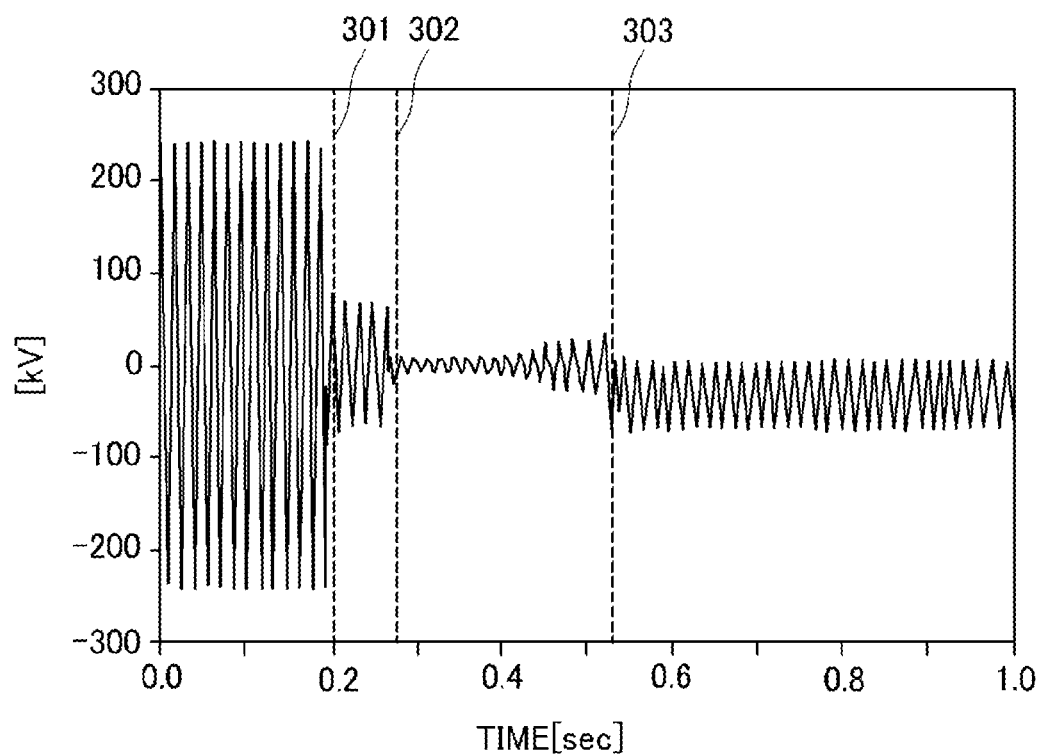
FIG. 3 shows a faulted phase voltage waveform measured at a relay point of a sending end in case of a single line-to-ground fault in a one machine infinite bus simulation system having a voltage of about 345 kV in accordance with an embodiment of the present disclosure.

FIG. 3 shows a faulted phase voltage waveform measured at a relay point of a sending end in case of a single line-to-ground fault in a one machine infinite bus simulation system having a voltage of about 345 kV in accordance with an embodiment of the present disclosure.

Further, in addition to the above explanations, FIG. 3 shows a point 301 at which a fault occurs at about 0.2 seconds, a point 302 at which the fault is removed and a secondary arc is generated, and a point 303 at which the secondary arc is extinguished. Herein, harmonic components may be extracted by using a short time Fourier transform and a ratio between the even harmonics and the odd harmonics among the extracted harmonic components may be analyzed to calculate a HR value defined by the equation 2. Resultantly, a HR waveform as depicted in FIG. 4 can be obtained.

Figure 4:
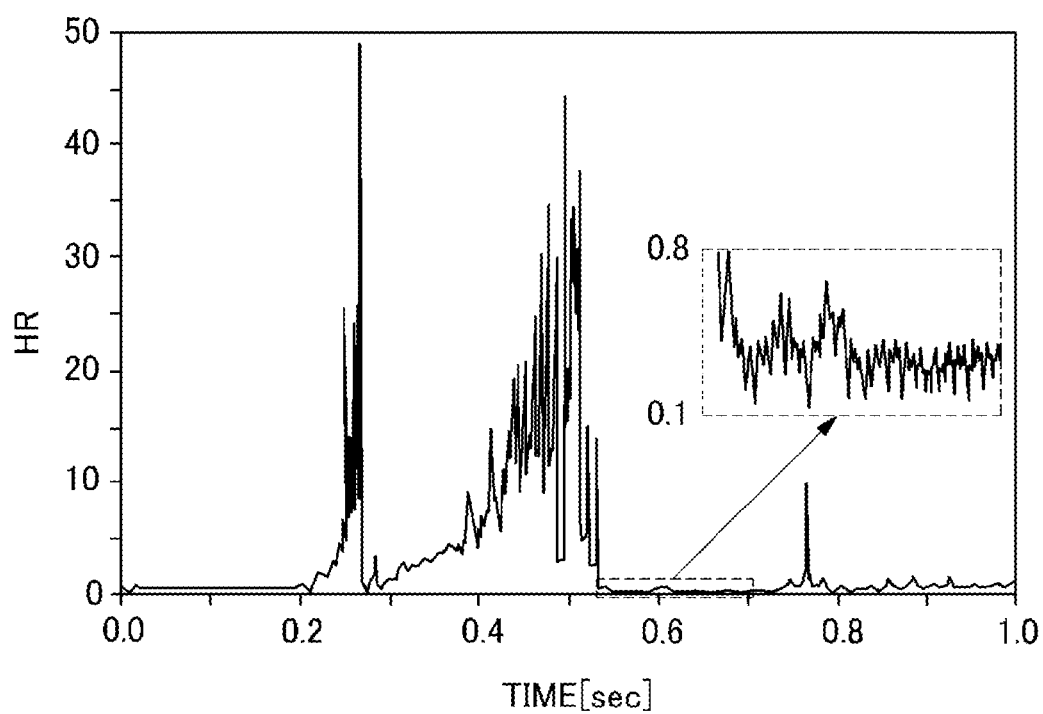
FIG. 4 shows a HR (Harmonic Ratio) waveform calculated based on the faulted phase voltage waveform of FIG. 3.

FIG. 4 shows a HR waveform calculated based on the faulted phase voltage waveform of FIG. 3.

As depicted in FIG. 4, in case of a fault in a transmission line, a HR value may be sharply increased and after an arc is finally extinguished, the HR value may be kept very low. This may be because a voltage waveform of an arc generated due to a fault has a shape similar to a square wave. The square wave may be made up of odd harmonic components, and, thus, the arc voltage waveform having a shape similar to that of the square wave may have odd harmonic components more than even harmonic components. Further, if the arc is finally extinguished, a recovery voltage may be generated. In this case, an odd harmonic may have a value similar to that of an even harmonic.

Further, it may be possible to calculate a minimum harmonic ratio value (HR_m) obtained by applying a minimum filter to the HR value through an after-treatment process. More details thereof will be provided by reference to FIG. 5.

Figure 5:
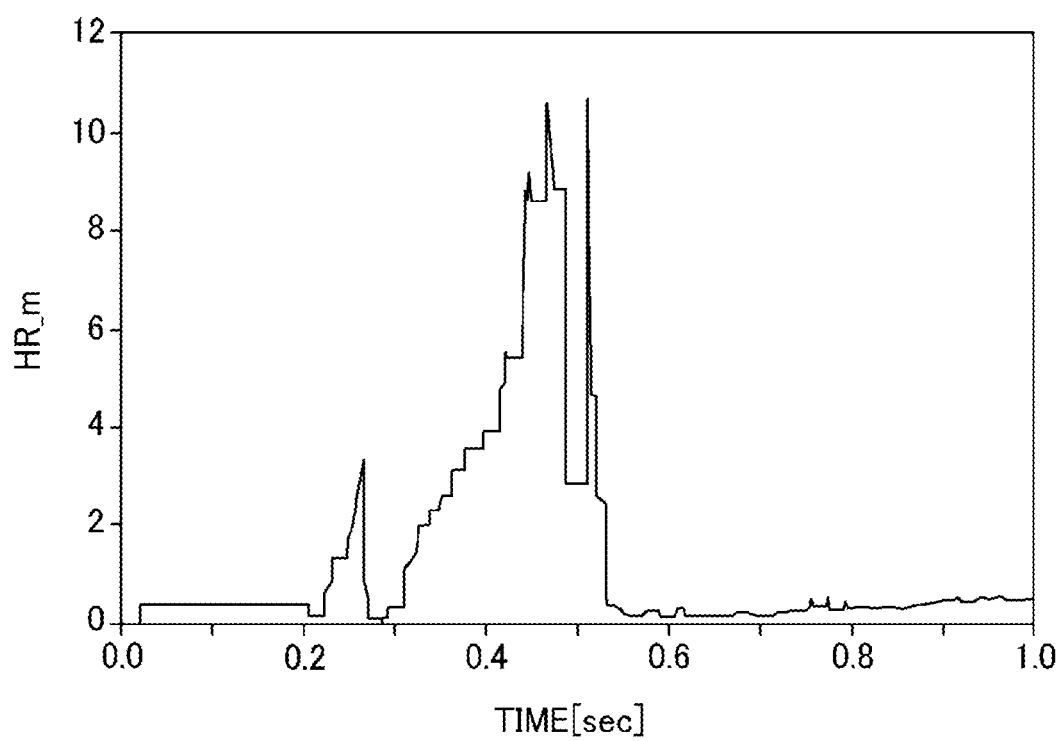
FIG. 5 shows a data waveform obtained by applying a minimum filter to the HR waveform of FIG. 4.

FIG. 5 shows a data waveform obtained by applying a minimum filter to the HR waveform of FIG. 4

As depicted in FIG. 5, a HR_m value can be calculated by applying a minimum filter to the HR waveform of FIG. 4 and the calculated HR_m value may be used to determine whether or not a secondary arc is finally extinguished. Herein, while moving a window along the HR waveform of FIG. 4, the minimum filter may extract a minimum value from the HR values included in the window. A size of the window may be about 16.67 ms and a sampling frequency may be about 7.2 kHz.

In this case, it can be seen that when the HR_m value is smaller than or equal to a predetermined reference value, a secondary arc generated due to a fault may be finally extinguished. If a final extinction point of the secondary arc is detected, the reclosing relays 101 and 102 may reclose a leader station circuit breaker first and after a voltage testing, the reclosing relays 101 and 102 may reclose a follower station circuit breaker.

As described above, it may be possible to greatly increase reliability of power supply by effectively detecting a final extinction point of a secondary arc by the reclosing method in accordance with the present disclosure as compared to a conventional reclosing method.

Figure 6:
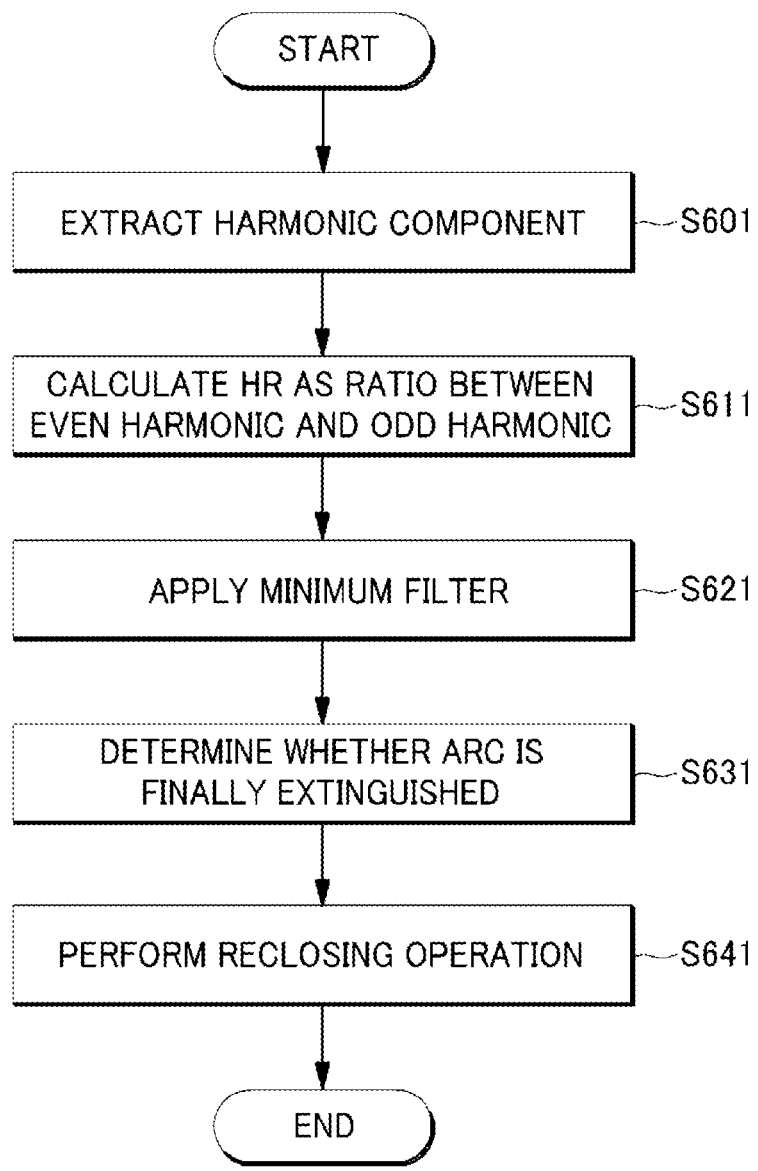
FIG. 6 is a flowchart of a reclosing control method in accordance with an embodiment of the present disclosure.

FIG. 6 is a flowchart of a reclosing control method in accordance with an embodiment of the present disclosure.

As depicted in FIG. 6, by way of example, if a fault occurs in a transmission line and a circuit breaker is fully opened, harmonic components contained in a faulted phase voltage waveform may be extracted (S601). In this case, it may be possible to extract harmonic components contained in faulted phase voltage waveform by using a short time Fourier transform.

Then, based on the extracted harmonic components, a ratio value (HR) between even harmonics and odd harmonics may be calculated (S611).

Thereafter, a minimum harmonic ratio value (HR_m) may be calculated by applying a minimum filter (S621). Herein, the HR_m value can be calculated by moving a window along a HR waveform and extracting a minimum value from HR values included in the window.

Subsequently, the calculated HR_m value may be compared with a preset reference value to determine whether or not a secondary arc is finally extinguished (S631).

Then, if it is determined that the secondary arc is finally extinguished, a reclosing operation may be performed (S641). By way of example, if the HR_m value is smaller than or equal to the preset reference value, it may be determined that the arc is finally extinguished and the reclosing operation may be performed.

In step S621 and step S631, if it is determined whether or not the secondary arc is finally extinguished by comparing the ratio value (HR) between the even harmonics and the odd harmonics with the reference value, an after-treatment process for calculating the HR_m value by applying the minimum filter may be omitted.

Figure 7:
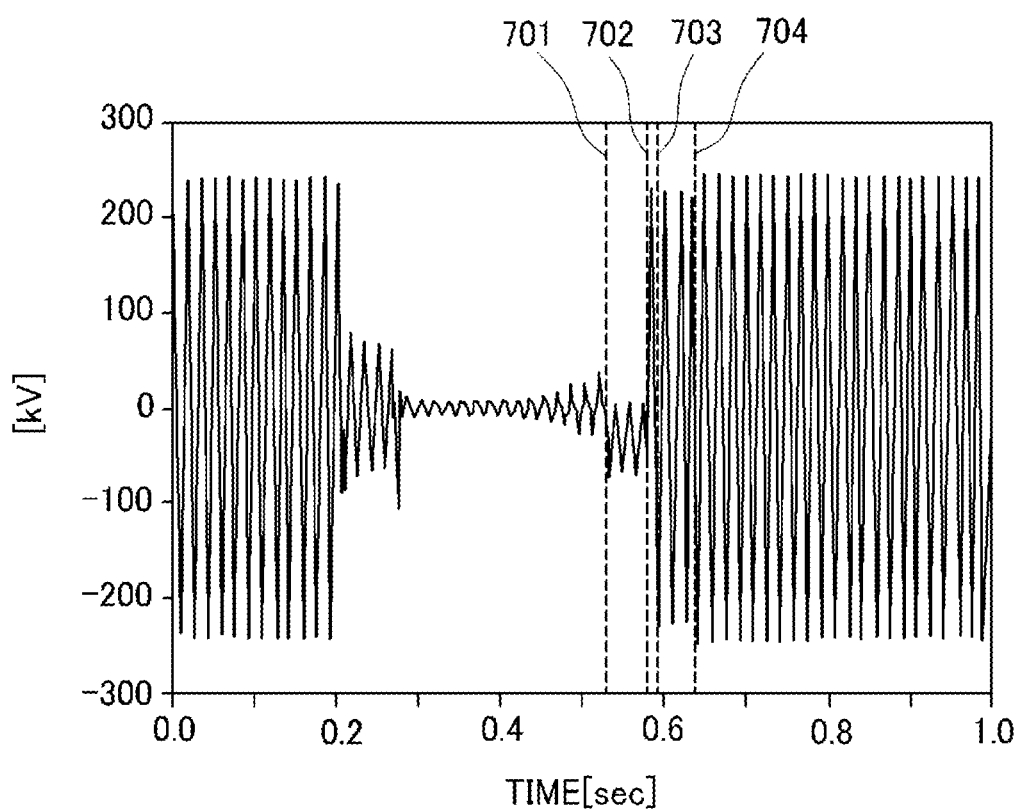
FIG. 7 shows a faulted phase voltage waveform measured when a single line-to-ground fault occurs in a one machine infinite bus simulation system having a voltage of about 345 kV in accordance with an embodiment of the present disclosure.
Figure 8:
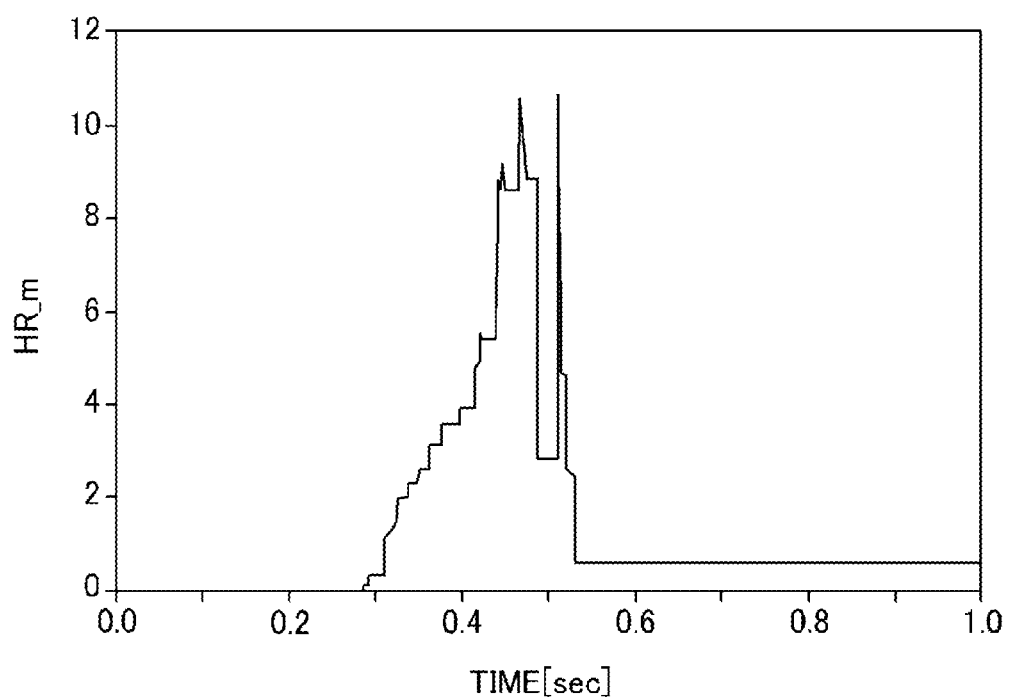
FIG. 8 shows a HR waveform, to which a minimum filter is applied, measured when a single line-to-ground fault occurs in a one machine infinite bus simulation system having a voltage of about 345 kV in accordance with an embodiment of the present disclosure.

FIG. 7 shows a faulted phase voltage waveform measured when a single line-to-ground fault occurs in a one machine infinite bus simulation system having a voltage of about 345 kV in accordance with an embodiment of the present disclosure. FIG. 8 shows a HR waveform, to which a minimum filter is applied, measured when a single line-to-ground fault occurs in a one machine infinite bus simulation system having a voltage of about 345 kV in accordance with an embodiment of the present disclosure.

FIG. 7 shows a point 701 at which it is determined that a secondary arc is finally extinguished and a point 702 at which after a time delay of three cycles, a leader station circuit breaker is reclosed in a faulted phase voltage waveform measured when a single line-to-ground fault occurs in a one machine infinite bus simulation system having a voltage of about 345 kV.

Further, FIG. 7 shows a point 703 at which a voltage testing is performed after the leader station circuit breaker is reclosed and a point 704 at which after the voltage testing and a time delay of three cycles, a follower station circuit breaker is reclosed and a reclosing operation is ended.

It can be seen that by applying the reclosing control method of the present disclosure to various simulations for checking performance, it is determined that a secondary arc is finally extinguished at about 60 Hz in about a half of a cycle.

As depicted in FIG. 8, in a calculated HR_m waveform with respect to the faulted phase voltage waveform of FIG. 7, a circuit breaker may be single-phase tripped in about four cycles after a fault occurs at about 0.2 seconds and a HR_m value may be calculated from that point. Further, after the HR_m value exceeds about 1.0, when the HR_m value becomes smaller than or equal to about 0.6, if it is determined that a secondary arc is finally extinguished, a calculation of the HR_m value may be ended. If it is determined that a secondary arc is not finally extinguished, a calculation of the HR_m value may be repeated for each sample.

Each component depicted in FIG. 1 may be configured as a kind of "module". The "module" may include software or hardware such as a field programmable gate array (FPGA) or an application specific integrated circuit (ASIC) and the modules may perform predetermined roles. However, the modules are not limited to the software or the hardware. The modules may be configured to be in an addressable storage medium or to execute on ore more processors. Functions provided by the components and modules may be combined in a smaller number of components and modules or may be further divided in additional components and modules.

The above description of the present invention is provided for the purpose of illustration, and it would be understood by those skilled in the art that various changes and modifications may be made without changing technical conception and essential features of the present invention. Thus, it is clear that the above-described embodiments are illustrative in all aspects and do not limit the present invention. For example, each component described to be of a single type can be implemented in a distributed manner. Likewise, components described to be distributed can be implemented in a combined manner.

The scope of the present invention is defined by the following claims rather than by the detailed description of the embodiment. It shall be understood that all modifications and embodiments conceived from the meaning and scope of the claims and their equivalents are included in the scope of the present invention.

What is claimed is:

1. A reclosing control device configured to perform a reclosing control in case of a fault in a transmission line, the reclosing control device comprising:
    a voltage detection unit configured to detect a faulted phase voltage waveform and extract a harmonic component contained in the faulted phase voltage waveform;
    a HR calculating unit configured to calculate ratio values between even harmonics and odd harmonics based on the extracted harmonic component; and
    a reclosing control unit configured to determine whether or not an arc is finally extinguished based on the calculated ratio value and perform a reclosing control depending on a result of the determination.

2. The reclosing control device of claim 1, further comprising:
    a filtering unit configured to filter a minimum value from the ratio values included in a window while moving the window of a certain size along a waveform having the calculated ratio values,
    wherein the reclosing control unit compares the filtered minimum value with a preset reference value and determines whether or not the arc is finally extinguished.

3. The reclosing control device of claim 1,
    wherein the voltage detection unit extracts the harmonic component contained in the faulted phase voltage waveform by using a short time Fourier transform (STFT).

4. The reclosing control device of claim 1,
    Wherein the HR calculation unit calculates a harmonic ratio (HR) value between the even harmonics and the odd harmonics of the extracted harmonic component based on the following equation 1:

$$HR = \frac{\sqrt{\sum_{n=1}^{m} V_{2n+1}^2}}{\sqrt{\sum_{n=1}^{m} V_{2n}^2}} \qquad \langle \text{Equation 1} \rangle$$

in the equation 1, $V_{2n}$ denotes an even harmonic component and $V_{2+1}$ denotes an odd harmonic component.

5. A reclosing relay including the reclosing control device of claim 1.

6. A reclosing control method using a reclosing control device, the reclosing control method comprising:
    (a) detecting a faulted phase voltage waveform;
    (b) extracting a harmonic component contained in the faulted phase voltage waveform;
    (c) calculating ratio values between even harmonics and odd harmonics based on the extracted harmonic component; and
    (d) determining whether or not an arc is finally extinguished based on the calculated ratio values and performing a reclosing control depending on a result of the determination.

7. The reclosing control method of claim 6,
    wherein (c) calculating a ratio value between even harmonics and odd harmonics based on the extracted harmonic component includes filtering a minimum value from the ratio values included in a window while moving the window of a certain size along a waveform having the calculated ratio values, and it is determined whether or not the arc is finally extinguished by comparing the filtered minimum value with a preset reference value.

8. The reclosing control method of claim 6, wherein (b) extracting a harmonic component contained in the faulted phase voltage waveform includes extracting the harmonic component contained in the faulted phase voltage waveform by using a short time Fourier transform (STFT).

9. The reclosing control method of claim 6, wherein (c) calculating ratio values between even harmonics and odd harmonics based on the extracted harmonic component includes calculating a harmonic ratio (HR) value between the even harmonics and the odd harmonics of the extracted harmonic component based on the following equation 1:

$$HR = \frac{\sqrt{\sum_{n=1}^{m} V_{2n+1}^2}}{\sqrt{\sum_{n=1}^{m} V_{2n}^2}} \quad \langle \text{Equation 1} \rangle$$

in the equation 1, $V_{2n}$ denotes an even harmonic component and $V_{2n+1}$ denotes an odd harmonic component.

* * * * *

UNITED STATES PATENT AND TRADEMARK OFFICE
CERTIFICATE OF CORRECTION

PATENT NO. : 8,743,519 B2  Page 1 of 1
APPLICATION NO. : 13/179696
DATED : June 3, 2014
INVENTOR(S) : Chul Hwan Kim et al.

It is certified that error appears in the above-identified patent and that said Letters Patent is hereby corrected as shown below:

In the Specification

Column 5, line 39, please replace "$V_{21}$" with - $V_{2n}$ -

Column 8, line 49, please replace "$V_{2+1}$" with - $V_{2n+1}$ -

Signed and Sealed this
Sixteenth Day of September, 2014

Michelle K. Lee
*Deputy Director of the United States Patent and Trademark Office*